July 3, 1934.  C. F. SHEFLIN  1,965,161
AUTOMOBILE STORAGE APPARATUS
Original Filed May 20, 1929  3 Sheets-Sheet 1
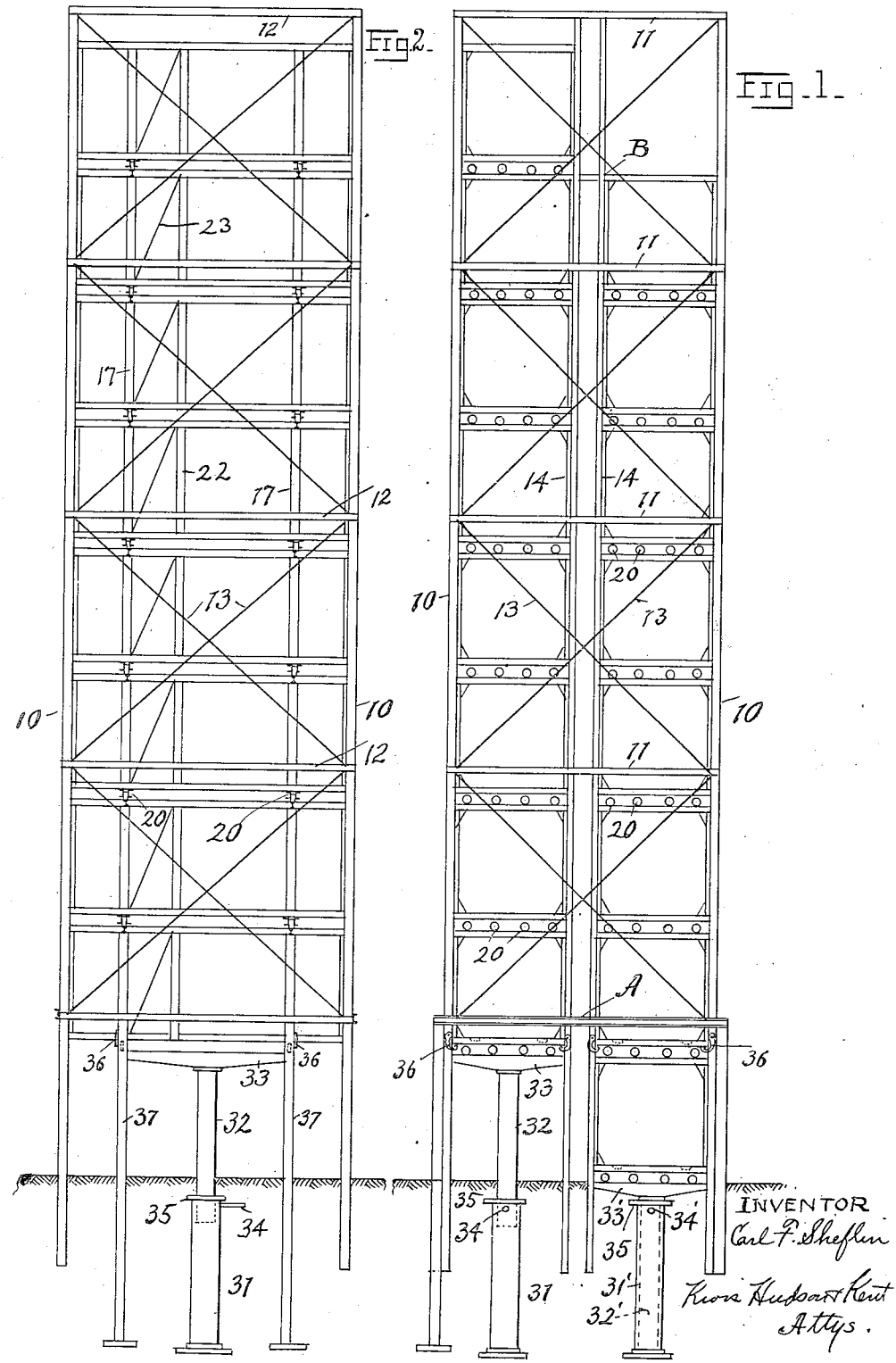

July 3, 1934.    C. F. SHEFLIN    1,965,161
AUTOMOBILE STORAGE APPARATUS
Original Filed May 20, 1929    3 Sheets-Sheet 2
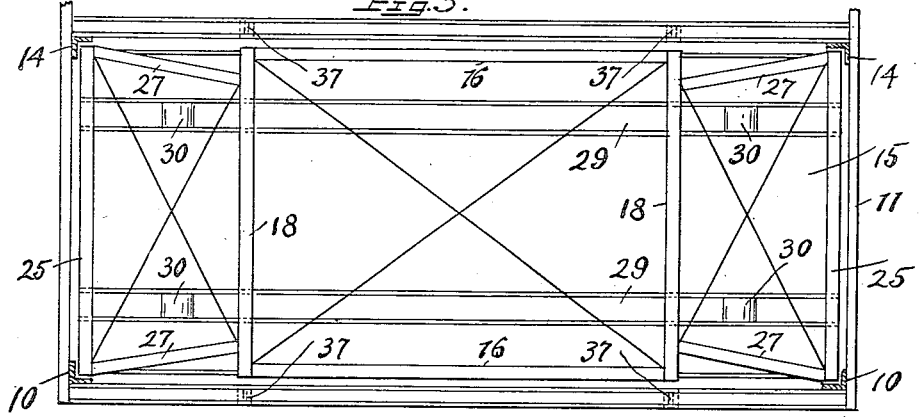
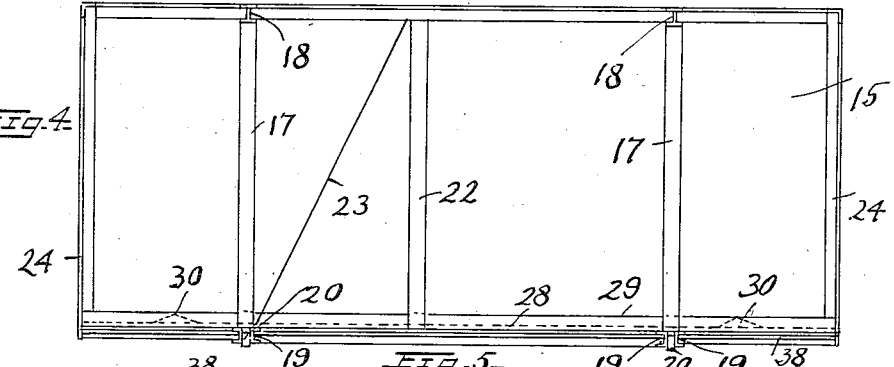
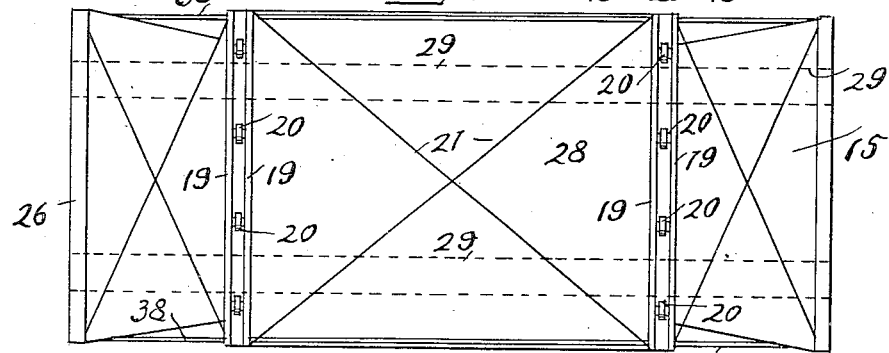
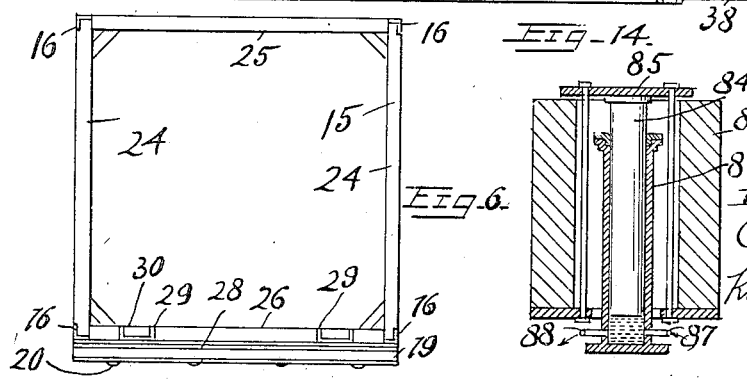
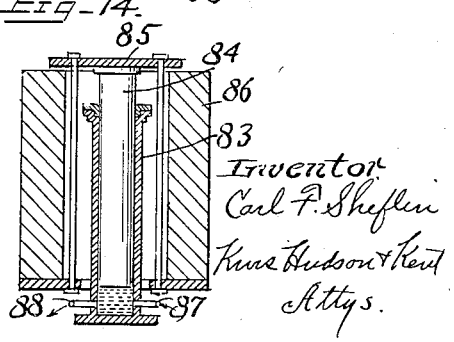

July 3, 1934.  C. F. SHEFLIN  1,965,161
AUTOMOBILE STORAGE APPARATUS
Original Filed May 20, 1929   3 Sheets-Sheet 3
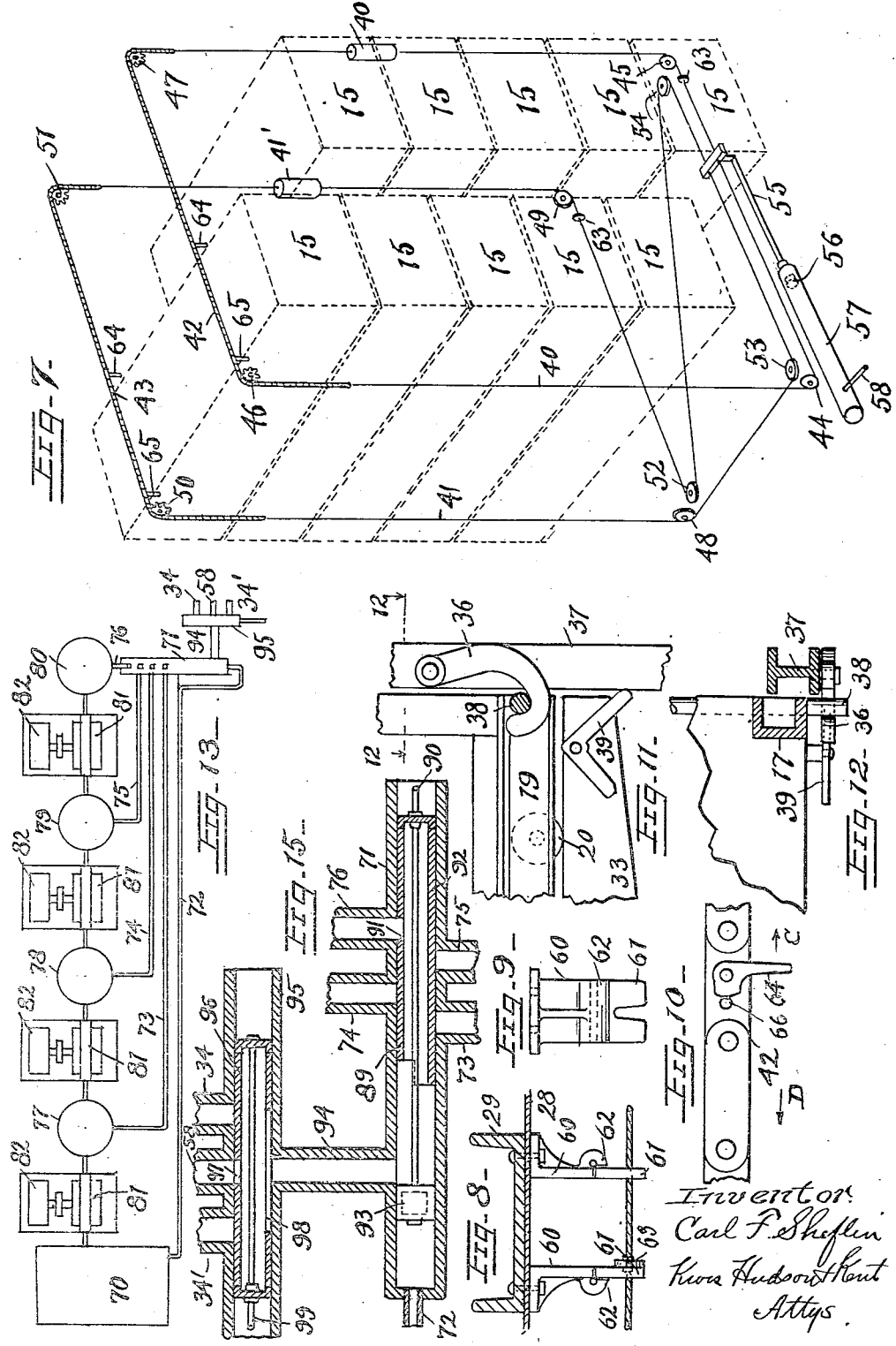

Patented July 3, 1934

1,965,161

UNITED STATES PATENT OFFICE 1,965,161

AUTOMOBILE STORAGE APPARATUS

Carl F. Sheflin, Cleveland, Ohio, assignor to Paul S. Schmidt, Cleveland, Ohio

Application May 20, 1929, Serial No. 364,379
Renewed December 6, 1933

16 Claims. (Cl. 214—16.1)

This invention relates to improvements in automobile storage apparatus and embodies cages or carriers each adapted to hold one automobile, these carriers being arranged in two stacks that are positioned side by side. Operating means is employed, by virtue of which the carriers are moved in a closed path up one stack and down the other until any given carrier arrives at a position opposite the loading or unloading platform.

One of the objects of the invention is the provision of an automobile storage apparatus in which space is conserved to the greatest degree possible.

Another object is the provision of means in accordance with which the delivery of a stored automobile may be accomplished in a minimum of time, without the necessity of either the operator or the driver leaving the ground floor of the garage.

Another object is the provision of automobile carriers of a form such that they may be arranged in stacks and may be caused to travel horizontally from one stack to the other both at the bottom and at the top, with means for elevating and lowering the stacks, whereby the carriers may be moved in a closed path up one stack and down the other.

A further object is the provision of a special means for accomplishing the transverse movement or cross-shifting of carriers at the top and bottom simultaneously.

Still another object is the provision of hydraulic means for operating the elevators and the cross-shifters in a manner to conserve power and render the operation of the apparatus as economical as possible.

Other objects and features of novelty will appear as I proceed with the description of that embodiment of the invention which, for the purposes of the present application, I have illustrated in the accompanying drawings, in which Figure 1 is a front end elevational view of a structure embodying the invention.

Fig. 2 is a side elevation of the same.

Fig. 3 is a top plan view of one of the carriers, with the stack guides shown in section.

Fig. 4 is a side elevation of a carrier.

Fig. 5 is a bottom plan of a carrier.

Fig. 6 is an end elevational view of a carrier.

Fig. 7 is a perspective view illustrating diagrammatically a means for cross-shifting carriers at the top and bottom of the apparatus simultaneously.

Fig. 8 is a fragmental detail view illustrating the means I employ for providing engagement between the bottom of a carrier and the cross-shifting cable.

Fig. 9 is a side elevational view of one of the brackets and swinging abutments illustrated in Fig. 8.

Fig. 10 is a detail view of a fragment of one of the chains employed for cross-shifting carriers at the top of the apparatus.

Fig. 11 is a fragmental detail view showing one of the stack supporting latches which may be employed in connection with the invention.

Fig. 12 is a fragmental plan view taken partially in section on the line 12—12, Fig. 11.

Fig. 13 is a diagrammatic plan view illustrating a preferred hydraulic power system for the operation of the elevators and cross-shifters.

Fig. 14 is a vertical sectional view through one of the hydraulic accumulators employed in the system of Fig. 13, and Fig. 15 is a diagrammatic detail sectional view of a valve means for controlling the operation of a hydraulic system.

Similar reference characters refer to like parts throughout the views.

In accordance with my invention automobiles are stored in towers, each tower containing a pair of stacks, and each stack being made up of a series of automobile carriers of a crate-like appearance, there being no positive connection whatever between one carrier and the other carriers adjacent thereto. A garage may contain one or any greater number of towers. These towers comprise vertical corner members, preferably rolled steel members of suitable section, such as angle bars or I-bars. These corner members 10 are joined at intervals on the front and back of the tower by horizontal tie bars 11, and on the sides of the tower by similar bars 12. Crossed bracing rods or wires 13 are also employed.

Along the front and back of the tower I employ further vertical members 14 in pairs spaced apart. These members from a level A in Fig. 1 to a level B in the same figure are angle bars. Below the level A and above the level B they are flat and lie in planes parallel with the front and back of the tower, and therefore do not interfere with cross-shifting of the carriers. The corner members 10 and the intermediate vertical members 14 between the levels A and B constitute vertical guides for the carriers.

The carriers 15 are of open construction and are formed preferably entirely of steel or other metal. Each carrier may be provided with longitudinal corner members 16 extending throughout the middle main portion of the carrier, these corner members being joined by vertical side members 17, horizontal top members 18 which serve also as transverse tracks, and pairs of horizontal channel bars 19 at the bottom. The bars 19 of each pair are spaced apart and supporting wheels or rollers 20 are mounted between them, the rollers 20 of one carrier being adapted to run upon the tracks 18 of the carrier next below. This central portion of the carrier is braced by cross rods 21 at both the top and the bottom. Intermediate the members 17 along each side I employ a further vertical bar 22. On one side of bar 22 there may be a bracing rod 23, but the space between the bar 22 and the other member 17 is left entirely open in order that there may be no interference with the swinging of a door in the automobile being carried. The distance between the members 17 is approximately the same as the wheel base of the average automobile so that the weight of the various units is concentrated principally at four points near the members 17, and these members serve to transmit the weight from each unit to those below.

The end portions of the carriers beyond the vertical members 17 are not required to carry much weight, and may be constructed somewhat lighter than the central portion of the carrier. These end portions comprise vertical corner pieces 24 joined at the ends by top and bottom horizontal members 25 and 26. The end portions also include horizontal top members 27 which are arranged along diagonal lines, as shown, in order to leave four vertical recessed portions for a purpose hereinafter to appear.

Across the bottom of each carrier I prefer to employ a sheet metal drip pan 28 covering substantially the entire bottom of the carrier, in order to protect each automobile from the drippings and from the dust and dirt of those above it. Along the bottom of each carrier I mount a pair of longitudinal channel rails or tracks 29, spaced apart the distance of the standard automobile tread. In the grooves or tracks thus provided for holding the wheels of the automobile I provide humps 30 over which it is easily possible to run the wheels of an automobile, but which serve to prevent any unintentional movement.

The two series of carriers 15 arranged in vertical alignment on either side of the tower are referred to herein as stacks. These stacks must be moved vertically in one direction or the other. In order to produce such movement I provide hydraulic cylinders 31 and 31' mounted in the foundation of the tower in alignment with the center of each stack. Pistons 32 and 32' work within the cylinders 31 and 31' and carry platforms 33 and 33' on their upper ends, these platforms being of sufficient size from front to rear to receive the two sets of wheels 20. Pressure fluid enters and leaves the cylinders 31 and 31' through suitable conductors 34 and 34'. The upper end of each cylinder is provided with suitable packing, as indicated at 35 to seal the sliding joint with the corresponding piston.

When one of the stacks is raised to elevate the uppermost carrier to a position above the level B, it is desirable to hold the stack in that position while the elevator descends to receive another carrier from the bottom of the other stack. Also, when the other stack is lowered to move its lowermost carrier to a position beneath the level A, it is desirable to take the weight of all of the remaining carriers of that stack by means independent of the lowermost carrier in order that such carrier may be shifted crosswise. To this end I provide for each stack four swinging latches 36. These latches are pivoted to intermediate upright frame members 37 arranged in the same planes with the upright members 17 of the carriers. They are adapted to assume by gravity a certain position illustrated in Fig. 11, and they are provided with hook-shaped lower ends adapted to receive round bars 38 extending lengthwise of the carriers along the bottom sides thereof. The vertical recessed portions of the carrier, previously referred to, permit the latches 36 to enter a carrier above the bars 38 and thus engage those bars as the carrier is raised.

On each of the platforms 33 and 33' there are pivoted four dogs 39 shaped like bell crank levers and arranged in the same vertical planes with the adjacent latches 36. When the platform is raised a slight distance beyond the position indicated in Fig. 11, the dogs 39 pass the corresponding latches 36. Now, when the platform again descends, the dogs 39 engage the latches 36 and deflect them outwardly, holding them in such deflected position long enough to permit the bars 38 to descend below the latches. In this deflecting action the dogs 39 are swung upon their pivots. By this means the stack of carriers may be lowered until the one next above the bottom carrier is caught by the latches 36.

In Fig. 7 I have illustrated a means for producing simultaneous cross-shifting of carriers at the top and bottom of the tower. In this figure there are shown two endless flexible elements comprising cable portions 40 and 41 and chain portions 42 and 43 respectively. The element 40, 42 is arranged entirely in a vertical loop which passes over pulleys 44, 45 at the bottom and over sprocket wheels 46, 47 at the top. The element 41, 43 in addition to a substantially closed vertical loop portion running over pulleys 48, 49 and sprocket wheels 50, 51, has a horizontal portion running over pulleys 52, 53 and 54, whereby one length of this horizontal portion is caused to run adjacent the lower horizontal portion of the element 40, 42. These two adjacent portions of the two flexible elements are both connected to the outer extremity of a piston rod 55 attached to a piston 56 working in a cylinder 57, having a connection 58 through which pressure fluid is adapted to be received and discharged. When pressure fluid is discharged from the cylinder 57, movement of the flexible elements in an opposite direction is effected by means of weights 40' and 41'.

Each of the carriers 15 is provided at the front and rear with a pair of brackets 60 secured preferably to the under side of one of the channels 29. To each of these brackets is pivotally connected a slotted abutment 61, that is free to swing in one direction, but is prevented from swinging in the other direction by a stop 62 carried by the bracket. On the lower run of each cable there is fixed a button 63 of a size too large to pass through the slot in the abutment 61. Whenever the cables are moved to carry the button 63 into position between the two abutments 61, motion of the cable thereafter in either direction will cause the button to engage one or the other of the abutments and shift the carrier sidewise accordingly.

It will be observed that the chain sections 42, 43 of the flexible elements move in a direction opposite to that of the cable sections upon which the buttons 63 are mounted. Each of these chain sections carries two pawls 64 and 65. These pawls hang down far enough to engage the horizontal corner bars 16 of the uppermost carrier 15 of an elevated stack. The pawl 64 is permitted to swing up and to ride over the carrier when the chain 42 moves in the direction of arrow C in Fig. 10, but it is prevented by a stop 66 on the chain from swinging up when the chain moves in the direction of arrow D. The pawls 65 are arranged reversely, so that they ride over the carrier when the chains move in the direction D. It will be obvious therefore that the pawls 64 and 65 enable the operator to shift a carrier crosswise in either direction, but always opposite to the direction in which a carrier is shifted by the buttons 63.

Referring now to Figs. 13, 14 and 15, 70 is an open water supply tank connected with a valve tube 71 by a conductor 72. Conductors 73, 74, 75 and 76 lead from the same valve tube 71 to accumulators 77, 78, 79 and 80 respectively. Interposed between the tank 70 and the accumulator 77 and between each succeeding pair of accumulators is a pumping unit comprising a pump 81 and a motor 82 for stepping up the pressure from the tank to the first accumulator and from each accumulator to the one above it. The detailed structure of the accumulators is of no special concern in the present case, but by way of illustration of the general principle involved I have shown in Fig. 14 a vertical cylinder 83 in which is mounted a plunger 84. On the top of the latter is a plate 85 from which is suspended a heavy weight 86 of cylindrical form. Connection to the pumps on either side of the accumulator may be had through a conductor 87, while the connection with the valve control is indicated at 88.

In the valve tube 71 there is mounted a valve sleeve 89, which is adapted to be moved longitudinally by a rod 90 or other suitable means. This sleeve is provided with ports 91 and 92 adapted to register one at a time with the conductors 73, 74, 75 and 76, or to connect fractional portions of the areas of these conductors simultaneously with the interior of the valve tube. The rod 90 also carries a piston 93 which is adapted to cover a short conductor 94, or to move to either side thereof. The opposite end of the conductor 94 connects with the second valve tube 95 in which there is a valve sleeve 96 that is closed at both ends. This sleeve has a port 97 therein adapted to register with any one of the conductors 34, 34' and 58. The sleeve also includes a long port 98 which registers with the conductor 94 in all three operative positions of the port 97. The valve sleeve 96 may be operated by a rod 99, or other suitable means.

An automobile loading platform, not shown, is provided in front of the tower opposite one or both of the stacks, on the level with the channel tracks 29 of the carriers when in their lowermost position. An automobile may be driven into a carrier when in the latter position. After a carrier is loaded, side shifts are made at the top and bottom of the tower, and another carrier is lowered into position for loading. Then the stack on the opposite side is raised and the procedure repeated until all of the carriers are loaded, assuming that there is no call for the delivery of an automobile from the tower in the meantime.

Now, assuming that it becomes necessary to deliver an automobile which happens to be positioned, for example, in the top carrier on the right-hand side of Fig. 7, first the cross-shifting apparatus is caused to move the lowermost right-hand carrier to the left and the uppermost left-hand carrier to the right. The right-hand elevator is then caused to rise sufficiently to disengage the right-hand stack from the latches 36, and then the stack is lowered, the carrier next above the bottom one being caught in the latches 36, so as to relieve the lowermost carrier of the weight of the remaining carriers in the stack. The left-hand elevator is now raised until the left-hand stack is caught by the latches 36, after which that elevator is again lowered. Now the cross-shifting apparatus is again caused to function as before, beginning a second series of operations, and this process is repeated until the carrier in question finally rests upon the elevator platform, when the automobile may be run out onto the unloading platform which is preferably at the rear of the tower. Had the automobile to be delivered been in the left-hand stack, the operator would have moved the controls to cause travel of the carriers through similar steps but in an opposite direction.

Assuming that it is desired to produce travel of the carriers in a clockwise direction, the valve sleeve 96 would be set in the position illustrated in Fig. 15, and the piston 93 would be moved to the right of the conductor 94, whereby pressure fluid would be permitted to discharge from the cylinder 57 through the conductor 58, valve sleeve 96, conductor 94, valve tube 71, and conductor 72 to the open tank 70. The weights 40' and 41' would then cause the flexible elements 40, 42 and 41, 43 to run clockwise, moving the lowermost carrier of the right-hand stack to the left and the uppermost carrier of the left-hand stack to the right. Now the sleeve 96 would be moved to cause port 97 to register with conductor 34, and the sleeve 89 would be moved to cause one of the ports 91, 92 to register with one of the conductors leading to the accumulators, the conductor 75 for instance. Hydraulic pressure from the accumulator 79 would thereby become effective to raise the platform 33 and the stack supported thereon. If the load should prove too great for the power available from the accumulator 79, the sleeve 89 could then be moved somewhat further toward the right in Fig. 15 to connect the elevator partly with the accumulator 79 and partly with the accumulator 80 or, if necessary, with the accumulator 80 alone. When the left-hand stack is thus raised to its highest position the latches 36 swing around the bars 38 and support the stack. The sleeve 89 is now moved back so as to cause one of its ports to register with the conductor for one of the accumulators lower down in the pressure scale and the pressure fluid in cylinder 31 is discharged into that accumulator. The right-hand stack is now to be lowered, but before that can be accomplished the stack must be raised sufficiently to disengage it from the latches 36. The sleeve 96 is adjusted to bring port 97 into registry with conductor 34'. The first necessary upward movement is of the platform 33' alone, requiring only a small amount of power. For this purpose the sleeve 89 is positioned so that port 92 registers with conductor 73. As soon as the platform engages the stack however, a heavy load is encountered. Then the sleeve 89 is moved so as to utilize the power in one of the high pressure accumulators for a short interval, that is until the stack is released from the latches 36, after which the sleeve 89 is moved to the left to connect the elevator cylinder 31' with one of the lower pressure accumulators, and the pressure in that cylinder is discharged into the accumulator, permitting the platform to descend with its single carrier. Again the cross-shifting must be effected, but the shifting apparatus must be first set. Valve sleeve 96 is accordingly brought to the position shown in Fig. 15 and sleeve 89 is moved to bring port 92 into registry with conductor 73. Pressure fluid then flows from accumulator 77 through the valves and conductor 58 into the cylinder 57 moving the piston 56 to the right. The buttons 63 are thereby moved into the space between the pairs of brackets 60, lifting the hinged abutment 61 at the end of each pair in order to enter that space. At the same time the chains 42, 43 at the top of the tower move toward the left, the pawls 65 swinging up and riding over the top of the uppermost carrier of the left-hand stack. As soon as these pawls get beyond the carrier they swing down again. Now the operator again moves the piston valve 93 to the right to connect the conductor 94 with the conductor 72, thereby exhausting the pressure fluid from the cylinder 57 and permitting the weights 40' and 41' to shift the top and bottom carriers as before.

The load to be lifted by each elevator will vary considerably, depending upon the number of carriers loaded at the time. Furthermore, the lowering of a stack will require but a short lift for the purpose of disengaging the latches, after which the lowering operation will deliver power, the amount delivered depending upon the loaded or unloaded condition of the carriers. Hence it is desirable to have flexible power control in order to obtain economical operation. This is accomplished by the power system herein disclosed. Furthermore, the power expended in lifting the carriers is returned to a large extent in lowering them and stored up in the accumulators.

While in the foregoing description and in the accompanying drawings I have disclosed with considerable particularity one embodiment of the invention, I desire it to be understood that such detail disclosure is primarily for the purpose of fully illustrating the invention, and is not to be construed as amounting to any limitation upon the scope of the invention.

Having thus described my invention, I claim:

1. In a vehicle storage apparatus, two stacks of carriers arranged side by side, means for raising and lowering either stack, an endless flexible element extending vertically along the remote sides of the two stacks and over the top and across the bottom of the same, and means associated with said endless element for transferring one carrier at a time from an end of one stack to the corresponding end of the other stack.

2. In a vehicle storage apparatus, two stacks of carriers arranged side by side, means for raising and lowering either stack through a distance approximately equal to the height of one carrier, an endless flexible element extending vertically along the remote sides of the two stacks and over the top and across the bottom of the same, and means associated with said flexible element for transferring a carrier from the top of the raised stack to the top of the lowered stack and from the bottom of the lowered stack to the bottom of the raised stack.

3. In a vehicle storage apparatus, two stacks of carriers arranged side by side, means for raising either stack and lowering the other stack through a distance approximately equal to the height of one carrier, an endless flexible element extending vertically along the remote sides of the two stacks and over the top and across the bottom of the same, and simultaneously actuated means associated with said endless flexible element for transferring the carrier from the top of the raised stack to the top of the lowered stack and from the bottom of the lowered stack to the bottom of the raised stack.

4. In a vehicle storage apparatus, two stacks of carriers arranged side by side, an endless flexible element extending vertically along the remote sides of the two stacks and over the top and across the bottom of the same, the carriers at the top and at the bottom of the stacks being each movable independently from one stack to the other, and means for moving said stacks vertically in either direction, whereby said carriers are movable in an endless path up one stack and down the other to bring any given carrier to a position opposite a loading and unloading station adjacent one of the stacks after traveling no more than one-half the length of said path.

5. In a vehicle storage apparatus, two sets of vertical guides, stacked carriers adapted to be moved either up or down in each of said sets of guides, an endless flexible element extending vertically along the remote sides of the two stacks and over the top and across the bottom of the same, and means associated with said endless flexible element for moving the uppermost carrier of a raised stack crosswise to the top of a lowered stack above said guides and for moving the lowermost carrier of the said lowered stack crosswise beneath said guides to a position below the said raised stack.

6. In a vehicle storage apparatus, two sets of vertical guides, stacked carriers in each of said sets of guides, the normal height of each stack exceeding the height of the guides by substantially the height of one carrier, means for moving each of said stacks either up or down, an endless flexible element extending vertically along the remote sides of the two stacks and over the top and across the bottom of the same, and means associated with said endless flexible element for moving the uppermost carrier of either stack crosswise to the top of the other stack above said guides and for moving the lowermost carrier of the latter stack crosswise beneath said guides to a position below the first stack.

7. In combination, two stacks of carriers arranged side by side, an endless flexible element extending vertically along the remote sides of the two stacks and over the top and across the bottom of the same, means for releasably supporting all of the carriers of one stack and all of the carriers of the other stack above the bottom one thereof, and means associated with said endless flexible element for transferring said bottom carrier to a position below the other stack and for transferring the top carrier of the latter stack onto the top of the first stack.

8. In apparatus of the class described, two stacks of carriers, a hydraulic elevator for each of said stacks, a series of hydraulic accumulators, means for producing different pressures in said accumulators, and valve means for connecting said accumulators progressively with either of said elevators whereby power expended in raising the carriers of one stack may be partly returned to the proper accumulator by the lowering of the other stack.

9. In apparatus of the class described, two stacks of carriers, a hydraulic elevator for each of said stacks, a series of pressure pumps, a series of accumulators arranged alternately with respect to said pumps, whereby each pump delivers to the accumulator next above it, and valve means for operatively connecting either of said elevators with any of said accumulators, whereby power expended in raising the carriers of one stack may be partly returned to the proper accumulator by the lowering of the other stack.

10. In apparatus of the class described, two stacks of carriers, a hydraulic elevator for each of said stacks, a series of pressure pumps, a series of accumulators arranged alternately with respect to said pumps, whereby each pump delivers to the accumulator next above it, and a common valve means for operatively connecting one of said elevators with any one of said accumulators or with two adjacent accumulators in the proportions desired, whereby varying degrees of power may be employed for raising the carriers, and the power returned by lowering the carriers may be distributed to the proper accumulators.

11. In a vehicle storage apparatus, vertically aligned carriers arranged in two stacks, releasable means for supporting an elevated stack beginning with the bottom carrier, releasable means for supporting a lowered stack beginning with the carrier next above the bottom one, an elevator for each of said stacks adapted to either raise or lower the stack, an endless flexible element extending vertically along the remote sides of the two stacks and over the top and across the bottom of the same, means associated with said endless flexible element for transferring the top carrier of the elevated stack onto the upper end of the lowered stack, and for transferring the lowermost carrier of the lowered stack into a position beneath the elevated stack, where it is adapted to be engaged by the elevator of that stack, said releasable means being automatically operable to engage the lowermost carrier of either stack when the stack is raised, and means moving proportionately with the movements of either elevator for withdrawing said releasable means when an elevator is raised a predetermined distance and then lowered.

12. In a vehicle storage apparatus, vertically aligned carriers arranged in two stacks, releasable stack supporting means mounted in operative relation with each of said stacks, an elevator for each of said stacks arranged therebelow adapted to either raise or lower the stack and capable of moving toward and away from said stack supporting means a distance approximately the height of one carrier, an endless flexible element extending vertically along the remote sides of the two stacks and over the top and across the bottom of the same, means associated with said endless flexible element for transferring a carrier from the top of either stack to the top of the other stack, means associated with said endless flexible element for transferring a carrier from one elevator to the other elevator below the said stack supporting means, said releasable means being automatically operable to engage the lowermost carrier of either stack when the stack is raised, and means moving proportionately with the movements of either elevator for withdrawing said releasable means when an elevator is raised a predetermined distance and then lowered.

13. In a vehicle storage apparatus, a frame, carriers arranged in two stacks, each of said carriers having projections correspondingly arranged, gravity latches on said frame for each stack adapted to engage with the projections of the lowest or next to lowest carrier of the stack to support said carrier and the carriers there-above, an elevator for each of said stacks adapted to either raise or lower the stack, said latches being adapted to engage projections on the lowermost carrier of either stack and support the stack when the elevator for that stack is raised to a given height, and means brought into operation by the movement of the elevator for automatically disabling the corresponding latches on the down stroke of the elevator subsequent to its upward travel beyond said given height, whereby the latches are then effective to automatically engage the projections on the next to lowest carrier of the stack.

14. In a vehicle storage apparatus, carriers arranged in two stacks, each of said carriers having projections correspondingly arranged, gravity latches for each stack adapted to engage with the projections of the lowest or next to lowest carrier of the stack to support said carrier and the carriers thereabove, an elevator for each of said stacks adapted either to raise or lower the stack, said latches being adapted to engage projections on the lowermost carrier of either stack and support the stack when the elevator for that stack is raised to a given height, and means upon each elevator for automatically disabling the corresponding latches on the down stroke after the elevator has been raised to a height greater than the aforesaid given height, and effective until said projections have passed below the range of action of said latches, whereby the latches are then effective to automatically engage the projections on the next to the lowest carrier of the stack.

15. In a vehicle storage apparatus, carriers arranged in two stacks, elevators for raising or lowering each stack a distance approximately equal to the height of one carrier, each of said carriers having projections correspondingly arranged, gravity latches for each stack adapted to engage with the projections on the lowest or next to lowest carrier of the stack to support said carrier and all of those above it, means for shifting the top carrier of one stack to the top of the second stack and the lowermost carrier of the second stack to the bottom of the first stack, said latches being adapted to engage projections on the lowermost carrier of the first stack when the elevator therefor has risen to a given height, and means brought into operation by the descent of the elevator for the second stack for disabling the latches for that stack after the elevator has first been raised a short distance above said given height, said means permitting the latches to again become effective after the lowermost carrier has descended below the range of action of said latches, whereby the weight of the stack is transferred from the lowermost carrier to the next to lowest carrier of the stack.

16. In a vehicle storage apparatus comprising a vertical series of carriers, an elevator upon which the series of carriers may be supported for movement either up or down, said carriers having projections similarly arranged, a gravity latch adapted to automatically engage one of said projections when the latter is raised to a given height, and means moving proportionately with said elevator for disabling said latch when the elevator is first raised to a height greater than said given height and then lowered, said disabling means being ineffective when the elevator is moved upwardly merely to the point of action of said latch.

CARL F. SHEFLIN.